(12) United States Patent
Miller et al.

(10) Patent No.: US 8,930,523 B2
(45) Date of Patent: Jan. 6, 2015

(54) STATEFUL BUSINESS APPLICATION PROCESSING IN AN OTHERWISE STATELESS SERVICE-ORIENTED ARCHITECTURE

(75) Inventors: Landon C. Miller, Tuscaloosa, AL (US); Siljan H. Simpson, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 1358 days.

(21) Appl. No.: 12/147,086

(22) Filed: Jun. 26, 2008

(65) Prior Publication Data
US 2009/0327389 A1  Dec. 31, 2009

(51) Int. Cl.
*G06F 15/173* (2006.01)
*G06F 9/46* (2006.01)

(52) U.S. Cl.
CPC ...................................... *G06F 9/461* (2013.01)
USPC ........................................................ 709/224

(58) Field of Classification Search
USPC .................. 709/201, 217, 224; 379/15.03
See application file for complete search history.

(56) References Cited

U.S. PATENT DOCUMENTS

| | | | |
|---|---|---|---|
| 5,838,968 A | 11/1998 | Culbert | |
| 7,185,105 B2 | 2/2007 | Chang et al. | |
| 7,814,142 B2* | 10/2010 | Mamou et al. ................ | 709/203 |
| 2002/0031086 A1 | 3/2002 | Welin | |
| 2002/0186692 A1 | 12/2002 | Chang et al. | |
| 2004/0264671 A1 | 12/2004 | Lamberton et al. | |
| 2005/0132008 A1 | 6/2005 | Brown et al. | |
| 2005/0144226 A1* | 6/2005 | Purewal ........................ | 709/203 |
| 2005/0254493 A1 | 11/2005 | Chang et al. | |
| 2005/0273668 A1* | 12/2005 | Manning ......................... | 714/39 |
| 2006/0143031 A1 | 6/2006 | Bou-Ghannam et al. | |
| 2006/0143229 A1 | 6/2006 | Bou-Ghannam et al. | |
| 2006/0282886 A1* | 12/2006 | Gaug ................................ | 726/5 |
| 2007/0074215 A1* | 3/2007 | Bethea et al. ................. | 718/101 |
| 2008/0312778 A1 | 12/2008 | Correa et al. | |
| 2009/0063112 A1* | 3/2009 | Hader et al. ...................... | 703/6 |
| 2009/0327389 A1 | 12/2009 | Miller et al. | |
| 2009/0328040 A1 | 12/2009 | Miller et al. | |

OTHER PUBLICATIONS

Office Action, U.S. Appl. No. 12/147,086, Nov. 10, 2010.
Final Office Action, U.S. Appl. No. 12/147,086, Apr. 19, 2011.
Office Action, U.S. Appl. No. 12/147,014, Jun. 7, 2011.
Final Office Action, U.S. Appl. No. 12/147,014, Sep. 8, 2011.
Notice of Allowance, U.S. Appl. No. 12/147,014, Jan. 31, 2012.

\* cited by examiner

*Primary Examiner* — Krista Zele
*Assistant Examiner* — James Forman
(74) *Attorney, Agent, or Firm* — Edward J. Lenart; John R. Pivnichny; Biggers Kennedy Lenart Spraggins LLP

(57) ABSTRACT

Methods, apparatus, and products for stateful business application processing in an otherwise stateless service-oriented architecture ('SOA'), the SOA including SOA services where each SOA service carrying out a processing step of the business application, where the stateful business application processing includes: configuring each service of the SOA to record state information describing the state of the service upon completion of a processing step in the business application and provide the state information to a subsequent service; and executing the business application in the SOA, including sending requests for data processing among the services, each such request including a specification of the state of the executing business application.

12 Claims, 4 Drawing Sheets

STATEFUL BUSINESS APPLICATION PROCESSING IN AN OTHERWISE STATELESS SERVICE-ORIENTED ARCHITECTURE

BACKGROUND OF THE INVENTION

1. Field of the Invention

The field of the invention is data processing, or, more specifically, methods, apparatus, and products for stateful business application processing in an otherwise stateless service-oriented architecture ('SOA').

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

The execution of complex and computationally intense stateful processes in a service-oriented architecture is currently difficult due to many factors including, for example, process execution management delivered in a single, tightly-coupled stateful description of the process, tight relationships between the processing code and the data whose structure, relationships, and processing rules implicitly or explicitly are contained in both the processing code and the data, and the need to store intermediate states of the data in databases as the data is passed among a number of process steps, each of which may be very complex. These factors result in a very complex computing environment in which input data into such a process executed in the computing environment, the stateful data that is produced at each step in the process, the output data of the process, the logical flow of the process and each step, and the processing code is intertwined such that a reversal of the process, resuming the processes in mid-execution, or understanding of the state of the process at any particular steps in the process is difficult, if not impossible. Additionally, a process executed in such an environment and the environment itself is very expensive to design, build, maintain, and or replace once fully implemented.

SUMMARY OF THE INVENTION

Methods, apparatus, and products for stateful business application processing in an otherwise stateless service-oriented architecture ('SOA'), the SOA including SOA services where each SOA service carrying out a processing step of the business application, where the stateful business application processing includes: configuring each service of the SOA to record state information describing the state of the service upon completion of a processing step in the business application and provide the state information to a subsequent service; and executing the business application in the SOA, including sending requests for data processing among the services, each such request including a specification of the state of the executing business application.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
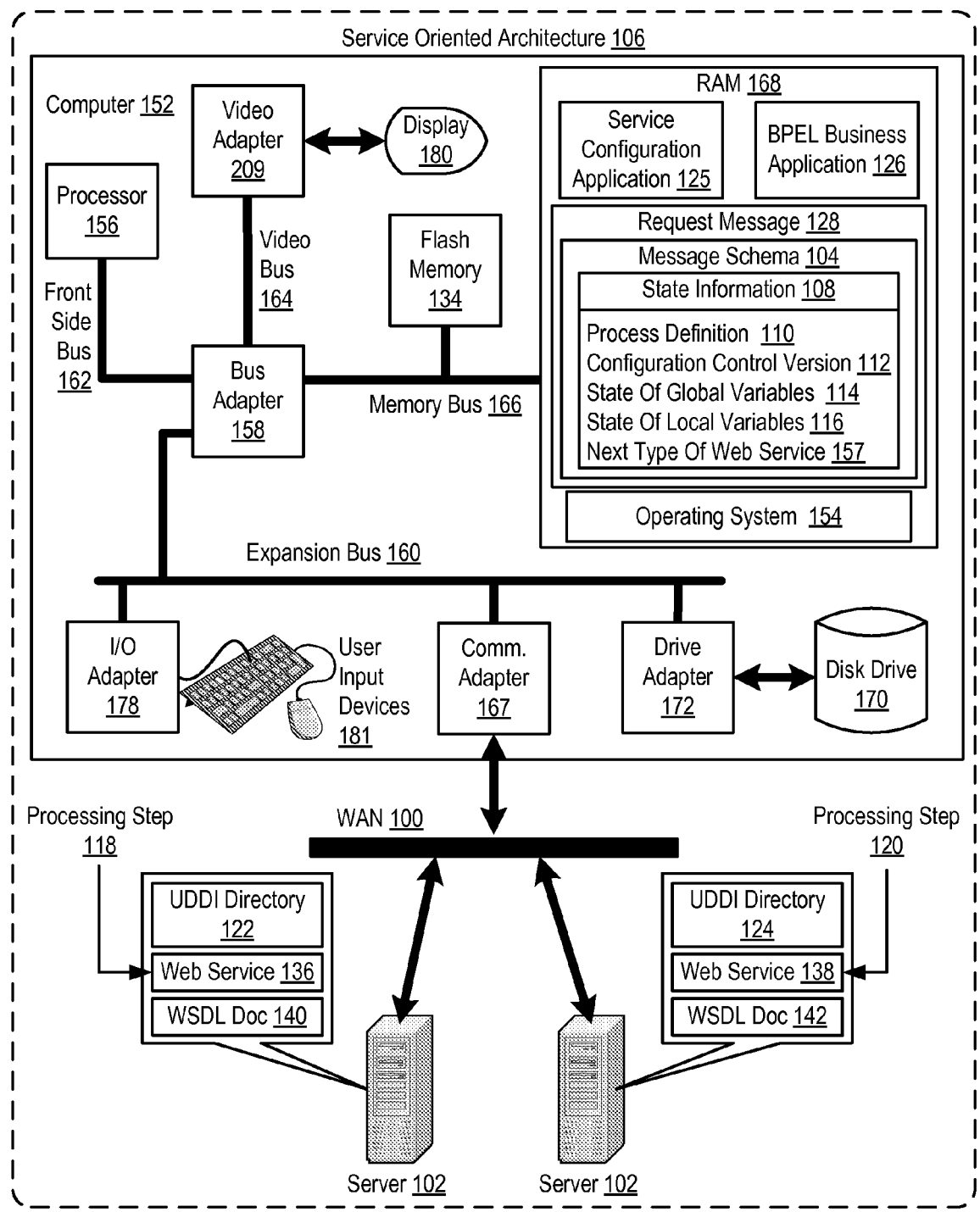
FIG. 1 sets forth a functional block diagram of an exemplary system for stateful business application processing in an otherwise stateless SOA according to embodiments of the present invention.

Exemplary methods, apparatus, and products for stateful business application processing in an otherwise stateless SOA in accordance with the present invention are described with reference to the accompanying drawings, beginning with FIG. 1. FIG. 1 sets forth a functional block diagram of an exemplary system for stateful business application processing in an otherwise stateless SOA (106) according to embodiments of the present invention. SOA is a software architecture in which functionality is grouped around business processes and packaged as interoperable services. SOA may also describe an information technology ('IT') infrastructure which allows different applications to exchange data with one another as the applications participate in business processes. The focus of SOA is a loose coupling of services with operating systems, programming languages and other technologies which support software applications. SOA separates functions into distinct units, or services, which are made accessible over a network such that the services may be combined and reused in the production of business applications. These services communicate with each other by passing data from one service to another, or by coordinating an activity between two or more services. SOA concepts are often seen as built upon, and evolving from older concepts of distributed computing and modular programming.

The SOA of FIG. 1 includes two SOA services, implemented here as a pair of interoperable web services (136, 138). An SOA service is a module of computer program instructions, implemented in a service-oriented architecture with other services, which when executed provides a well-defined service. A web service is defined by the World Wide Web Consortium ('W3C') as "a software system designed to support interoperable Machine to Machine interaction over a network." Web services are frequently web application program interfaces ('APIs') that can be accessed over a data communications network (100), such as the Internet, and executed on a remote system hosting the requested services. The W3C web service definition encompasses many different systems, but in common usage the term refers to clients and servers that communicate using Extensible Markup Language ('XML') messages that follow the Simple Object Access Protocol ('SOAP') standard.

The example web services (136, 138) in the system of FIG. 1 are described in web services description language ('WSDL') in a WSDL document (140, 142). WSDL is an XML-based language that provides a model for describing web services. A WSDL document describes web services as collections of network endpoints, or ports. A port is defined by associating a network address with a reusable binding, and a collection of ports define a service. Messages are abstract descriptions of the data being exchanged, and port types are abstract collections of supported operations. The concrete protocol and data format specifications for a particular port type constitutes a reusable binding, where the operations and messages are then bound to a concrete network protocol and message format. In this way, WSDL documents describe a public interface to the web service.

WSDL is often used in combination with SOAP and XML schema to provide web services over the Internet. A client program connecting to a web service can read the WSDL document to determine services that are available on the server. Any special datatypes used by the service are described in the WSDL document in the form of an XML schema. The client can then use SOAP to actually execute one of the services listed in the WSDL document.

Each web service (136, 138) in the example of FIG. 1 may also be registered in at least one Universal Description, Discovery and Integration ('UDDI') directory (122, 124). A UDDI directory is a platform-independent, XML-based registry for businesses to list services provided by the business on the Internet. UDDI is an open industry initiative, sponsored by OASIS, enabling businesses to publish service listings and discover each other and define how the services or software applications interact over the Internet.

The web services (136, 138) in the example of FIG. 1 are described in WSDL in a WSDL document and registered in a UDDI directory for clarity only. Readers of skill in the art will immediately recognize that web services useful as SOA services that carry out processing steps of a stateful business application according to embodiments of the present invention may be described in descriptive languages other than WSDL and may be registered in directories other than UDDI directories.

In the example of FIG. 1, each SOA service (136, 138) carries out a processing step (118, 120) of the business application. A business application as the term is used in this specification refers to a software application that provides business functionality in an SOA. Examples of business applications include applications that process customer orders, travel planning applications that purchase plane tickets, hotel rooms, reserve rental cars, and others as will occur to those of skill in the art.

A business application, according to embodiments of the present invention, may be a stateful business application. A 'state' is a unique configuration of information in a software program or machine. The term 'stateful,' when used here to describe a business application, refers to the fact that processing steps of the business application process data during execution of the business application in dependence upon the current state of the application. In contrast to the stateful business application executed in the SOA, the SOA itself according to embodiments of the present invention is otherwise stateless. That is, the framework in which the stateful business application is executed, the SOA and the set of SOA services used to execute the business application, is stateless when not executing the business application. When executing the business application, however, each individual service carries out a processing step of the business application—a processing step that processes data in dependence upon the current state of the application. As such, the SOA and its SOA services may be thought of as stateful when used to execute a stateful business application and stateless otherwise.

The system of FIG. 1 includes a computer (152) connected for data communications to other computers through a wide area network (100). The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is a service configuration application (125) and a BPEL business application (126).

A BPEL business application (126) is a business application as described above generated in business process execution language ('BPEL') by a BPEL engine. BPEL is a language for specifying business process behavior based on Web Services. A business process or business method is a collection of interrelated tasks which accomplish a particular goal. In the example of FIG. 1, any of the BPEL business application (126) and the web services (136, 148) may implement a business process because each service and the application may be described as a collection of interrelated tasks which accomplish a particular goal.

Business processes can be described in two ways in BPEL, as executable business processes or abstract business processes. Executable business processes model actual behavior of a participant in a business interaction. Abstract business processes are partially specified processes that are not intended to be executed. An abstract process may hide some concrete operational details. Abstract processes serve a descriptive role, with more than one possible use case, including observable behavior and process template. BPEL is meant to be used to model the behavior of both executable and abstract processes. A BPEL engine may generate an executable application in dependence upon such a BPEL description of one or more business processes.

The business application (126) of FIG. 1 is implemented with BPEL for clarity of explanation only. Readers of skill in the art will recognize that in addition to BPEL, SOA services, and business applications (126) according to embodiments of the present invention, may be implemented in other ways such as, for example, with a business rules engine, with a semantic networking, and the like.

The service configuration application (125) operates generally for stateful business application processing in an otherwise stateless SOA according to embodiments of the present invention. The service configuration application is a module of computer program instructions capable of configuring each service (136, 138) of the SOA to record state information describing the state of the service upon completion of a processing step in the business application and provide the state information to a subsequent service. State information as the term is used in this specification describes a current state of an executing business application. In addition to providing the state information to a subsequent service, the SOA services are also configured to provide business information, that is, output data of the execution of the service, to a subsequent service.

The computer (152) in the example of FIG. 1 executes the BPEL business application (126) stored in RAM (168) in the SOA (106). Executing the BPEL business application (126) in the SOA (106) may include sending requests for data processing among the services (136, 138). In the example of FIG. 1, the requests are sent in a request message (128), the structure, content, and semantics of which are defined by a message schema (108). Such a request message may be implemented with Extensible Markup Language ('XML'), HyperText Markup Language ('HTML'), another markup language, or in other ways as will occur to those of skill in the art. The request messages (128) sent among the web services (136,138) in the example of FIG. 1 may be sent as SOAP requests, that is, as data communications messages transmitted in accordance with SOAP protocol.

Each request sent among the services includes a specification of the state of the executing business application. In the example of FIG. 1, the state of the executing business application is specified by state information (108) in the message schema (108). Such state information (108) may include a process definition (110) for the business application (126), a specification of a configuration control version (112) for the business application, a current state of global variables (114), and a current state of local variables (116).

A process definition (110) for the business application (126) specifies the processing steps, global and local variables, initial values, the order of executing the processing steps, and other elements as will occur to those of skill in the art. Such a process definition (110) may be implemented with BPEL, semantic network diagrams, or other graphical flow diagramming tools, and expressed in a message schema of an XML message, an HTML message, or other markup language message. Readers of skill in the art will recognize that process definitions included in state information according to embodiments of the present invention may be dynamically generated during execution of the business application. That is, an SOA service may determine during execution of the business application that one or more additional processing steps not currently identified in the process definition are necessary for executing the business application and as such, may update the process definition to include such additional processing steps.

A specification of a configuration control version (112) for the business application identifies the current configuration of the business application for purposes of compatibility with SOA services. Because multiple instances of the same SOA service may be distributed across and administered by many different entities, current configuration of each of the multiple instances administered by a different entity may vary. As such, some instances of the SOA service may be configured to record state information describing the state of the service upon completion of a processing step in the business application and provide the state information to a subsequent service, while other instances of the SOA service may not be configured as such. In some embodiments of the present invention, therefore, the configuration control version (112) may be used by an SOA service to determine whether that SOA service is capable of executing a requested processing step including recording the state information and providing the state information to a subsequent service.

Any SOA service used to execute a processing step of the business application may alter the values of the global variables and local variables. Global variables are those variables accessible in every scope of the business application, that is, by any SOA service carrying out a processing step of the application. Local variables, by contrast, are those variables used by less than all SOA services that carry out processing steps of the business application. Stated another way, a local variable is typically associated with only one processing step while a global variable, by contrast, is associated with any and all processing steps of the business application.

In processing such a stateful business application according to embodiments of the present invention the SOA services, the web services (136, 138) of FIG. 1, are configured to update the current state of global variables (114) and the current state of local variables (116) upon completion of a processing step. In this way, each request sent from a particular SOA service to a subsequent service, carries with it the values of all variables at each service prior to the particular service, that is, during each previous processing step.

The state information (108) in the example of FIG. 1 may also include an identification of a next type of web service (157) to call for a next processing step of the business application. When the state information (108) includes such an identification of a next type of web service (157) to call, executing the business application may also include looking up in an UDDI directory (122, 124) the next type of web service for the next processing step in the business application.

As mentioned above, each SOA service in the example of FIG. 1 may also send along business information, that is, output data of the service, to a subsequent service. The SOA service may send such business information along to a subsequent service by storing the information in the message (128) along with the state information (108). By sending from one SOA service to the next, the state information (108) and the business information in messages, the state information and business information are decoupled from the SOA services and need not be maintained elsewhere, in a centralized database for example, effectively decoupling the information from complex, expensive, and inefficient storage devices.

Also stored in RAM (168) is an operating system (154). Operating systems useful for stateful business application processing in an otherwise stateless SOA according to embodiments of the present invention include UNIX™, Linux™, Microsoft XP™, Microsoft Vista™, AIX™, IBM's i5/OS™, and others as will occur to those of skill in the art. The operating system (154), service configuration application (125), and BPEL business application (126) in the example of FIG. 1, are shown in RAM (168), but many components of such software typically are stored in non-volatile memory also, such as, for example, on a disk drive (170) or in flash memory (134).

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that process stateful business application in an otherwise stateless SOA according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with a data communications network (100) and other computers, such as the servers (102) that host web services (136, 138). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for stateful business application processing in an otherwise stateless SOA according to embodiments of the present invention include modems for wired dial-up communications, Ethernet (IEEE 802.3) adapters for wired data communications network communications, and 802.11 adapters for wireless data communications network communications.

The arrangement of servers, computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
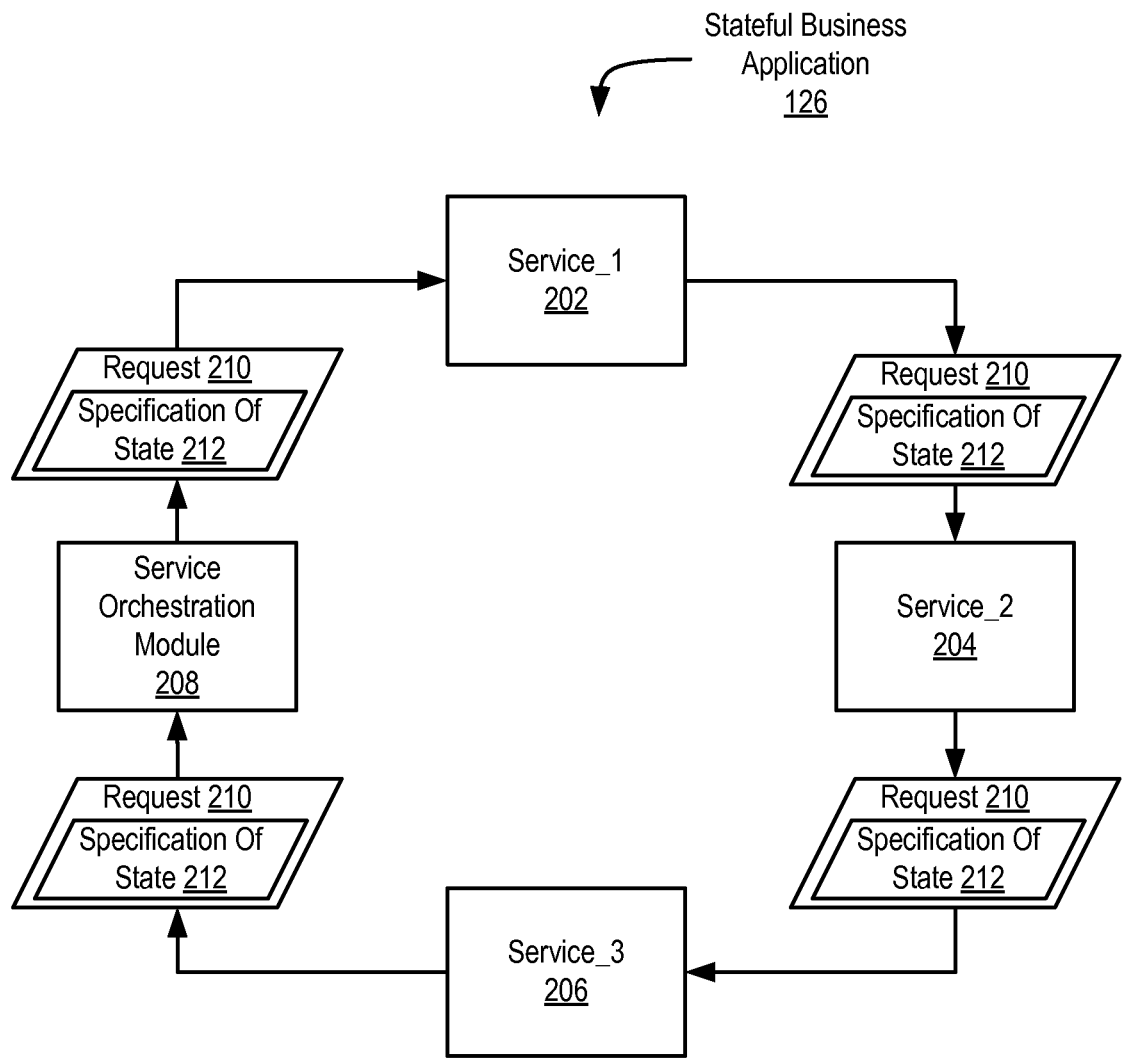
FIG. 2 sets forth a block diagram illustrating an exemplary stateful business application processed in an otherwise stateless SOA in accordance with embodiments of the present invention.

For further explanation, FIG. 2 sets forth a block diagram illustrating an exemplary stateful business application (126) processed in an otherwise stateless SOA in accordance with embodiments of the present invention. The stateful business application, in the example of FIG. 2, includes three services, service_1 (202), service_2 (204), and service_3 (206). Each of the services is configured to record state information describing the state of the service upon completion of a processing step in the business application and provide the state information to a subsequent service. Each service in the example of FIG. 2 carries out one processing step of the business application (126).

The business application (126) also includes a service orchestration module (208), a module of computer program instructions capable of initiating a first processing step of the stateful business application (126) and terminating the business application upon completion of all business processing steps of the business application. In the example of FIG. 2, when the business application (126) is executed, the service orchestration module (208) sends a request (210) to service_1 (202) for data processing. The request (210) includes a specification of the state (212) of the executing business application.

Service_1 (202) carries out a processing step of business application (126) in dependence upon the request and the state information that specifies the state of the executing business application. Upon completion of the processing step, service_1 (202) records in the specification (212) current state information of the currently executing business application. Service_1 then provides the specification, with the current state information, to the subsequent service, service_2 (204). In addition to the specification (212) of the state of the executing business application, the request (210) may also include business information, that is, output data produced by the execution of service_1 (202).

Service_2 (204) carries out a processing step of business application (126) in dependence upon the request (210) and the state information (212), including the information recorded by service_. Upon completion of the processing step, service_2 (204) records in the specification (212) additional current state information of the currently executing business application. Service_2 then provides the specification, with the additional current state information, to the subsequent service, service_3 (206). In addition to the specification (212) of the state of the executing business application, the request (210) may also include business information, that is, output data produced by the execution of service_2 (204).

Service_3 (206) carries out a processing step of business application (126) in dependence upon the request (210) and the state information, including the information recorded by service_2 and service_1. Upon completion of the processing step, service_3 (206) records in the specification (212) additional current state information of the currently executing business application. Service_3 then provides the specification, with the additional current state information, to the subsequent service, in this example the service orchestration module (208). In addition to the specification (212) of the state of the executing business application, the request (210) may also include business information, that is, output data produced by the execution of service_3 (206). The service orchestration module (208) process any data necessary in dependence upon the specification of the state which now includes the state information recorded by service_1 service_2, and service_3 and terminates the business application.

Figure 3:
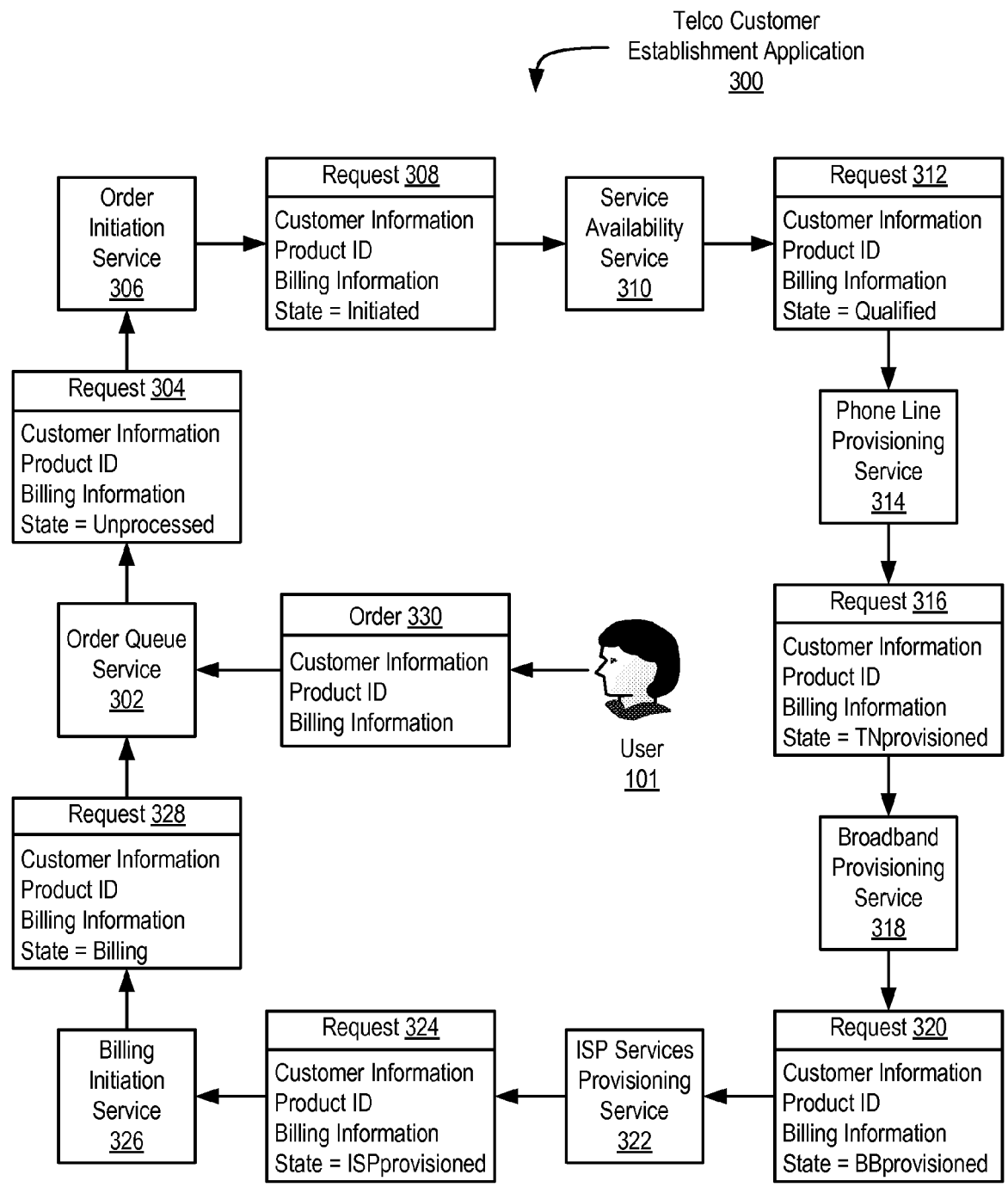
FIG. 3 sets forth a block diagram illustrating another exemplary stateful business application processed in an otherwise stateless SOA in accordance with embodiments of the present invention.

For further explanation, FIG. 3 sets forth a block diagram illustrating another exemplary stateful business application processed in an otherwise stateless SOA in accordance with embodiments of the present invention. The stateful business application in the example of FIG. 3 is a 'Telco' customer establishment application (300) used by a telephone and internet provider to process new customer orders (330). The term 'Telco' refers generally to a telephone company that may provide telephone services, broadband Internet services, and the like. The application (300) includes seven services: an order queue service (302), an order initiation service (306), a service availability service (310), a phone line provisioning service (314), a broadband provisioning service (318), an internet service provider ('ISP') provisioning service (322), and a billing initiation service (326).

Each of the services is configured to record state information describing the state of the service upon completion of a processing step in the business application and provide the state information to a subsequent service. In fact, each service in the example of FIG. 3 carries out one processing step of the business application (126).

The order queue service (302) is a module of computer program instructions capable of receiving an order (330) from a user (101) for establishing telephone services. Such an order (330) may include, for example, customer information, including the user's name and address, an identification of the product selected by the user, such as particular broadband and long-distance plans, and the user's billing information, such as a billing address. Upon receiving such an order (330), the order queue service may insert the order into a queue behind previously received orders. When the received order (330) is ready for processing, the order queue service sends a request (304) for processing to the order initiation service (306). The request (304) includes business information, such as customer information, product identification, and billing information, along with a specification of the state of the executing business application. In this example, the request (304) includes state information that indicates the state of the business application as 'unprocessed.'

The order initiation service (306) processes the request (304) and initiates the processing of the user's order (330), that is, the establishment of the user's selected products. The order initiation service process (306) may, for example, assign the user's order a unique identification to use during the execution of the application (300) and store such identification in a database in association with the customer information, product identification, and billing information included in the order. Upon completion of the processing step carried out by the order initiation service (306), the order initiation service (306) records in a request (308) for data processing business information produced by the service and a specification of the state of the executing business application that includes state information indicating the current state of the application (300) as 'initiated.' The order initiation service (306) then provides the request (308) for data processing, including the specification of state and the business information to the subsequent service, the service availability service (310).

The service availability service (310) processes the request (308) and checks availability of the products selected by the user (101). The service availability service (310) may, for example, search a database that associates zip codes, streets, and indications of service availability for each product selected by the user to determine whether the selected products are available and for each product available update a record in a database in association with the unique identification of the user's order assigned by the order initiation service. Upon completion of the processing step carried out by the service availability service (310), the service availability service (310) records in a request (312) for data processing business information produced by the service and a specification of the state of the executing business application that includes state information indicating the current state of the application (300) as 'qualified.' The service availability service (310) then provides the request (312) for data processing, including the specification of state and the business information to the subsequent service, the phone line provision service (314).

The phone line provisioning service (314) processes the request (312) and provisions a telephone line for the user (101). The phone line provisioning service (314) may, for example, associate, in a database, a telephone number with the user's address or with the unique identification of the user's order assigned by the order initiation service. Upon completion of the processing step carried out by the phone line provisioning service (314), the phone line provisioning service (314) records in a request (316) for data processing business information produced by the service and a specification of the state of the executing business application that includes state information indicating the current state of the application (300) as 'TNprovisioned,' that is, telephone number provisioned. The phone line provisioning service (314) then provides the request (316) for data processing, including the specification of state and the business information to the subsequent service, the broadband provisioning service (318).

The broadband provisioning service (318) processes the request (316) and provisions broadband for the user (101). The broadband provisioning service (318) may, for example, associate, in a database, an Internet Protocol ('IP') address with the user's address or with the unique identification of the user's order assigned by the order initiation service. Upon completion of the processing step carried out by the broadband provisioning service (318), the broadband provisioning service (318) records in a request (320) for data processing business information produced by the service and a specification of the state of the executing business application that includes state information indicating the current state of the application (300) as 'BBprovisioned,' that is, broadband provisioned. The broadband provisioning service (318) then provides the request (320) for data processing, including the specification of state and the business information to the subsequent service, the Internet Service Provider ('ISP') services provisioning service (322).

The ISP services provisioning service (322) processes the request (320) and provisions broadband for the user (101). The ISP services provisioning service (322) may, for example, associate, in a database, a domain name, email address, and the like with user's name, address, or the unique identification of the user's order assigned by the order initiation service. Upon completion of the processing step carried out by the ISP services provisioning service (322), the ISP services provisioning service (322) records in a request (324) for data processing business information produced by the service and a specification of the state of the executing business application that includes state information indicating the current state of the application (300) as 'ISPprovisioned,' that is, ISP services provisioned. The ISP services provisioning service (322) then provides the request (324) for data processing, including the specification of state and the business information to the subsequent service, the billing initiation service (326).

The billing initiation service (326) processes the request (324) and provisions broadband for the user (101). The billing initiation service (326) may, for example, associate, in a database, an Internet Protocol ('IP') address with the user's address or with the unique identification of the user's order assigned by the order initiation service. Upon completion of the processing step carried out by the billing initiation service (326), the billing initiation service (326) records in a request (328) for data processing business information produced by the service and a specification of the state of the executing business application that includes state information indicating the current state of the application (300) as 'billing.' The billing initiation service (326) then provides the request (328) for data processing, including the specification of state and the business information to the subsequent service, the order queue service (302). Upon receiving a request for data processing indicating that the state of the business application is 'billing' the order queue service removes the order (330) from the queue, effectively terminating the business application (300) for that order.

Figure 4:
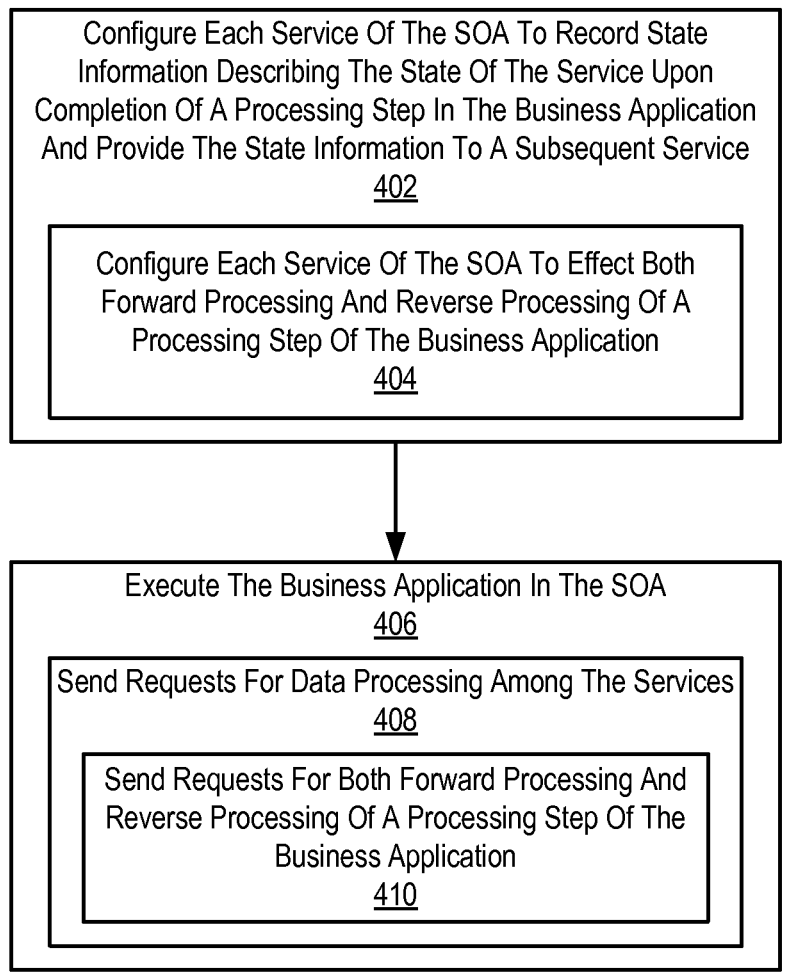
FIG. 4 sets forth a flow chart illustrating an exemplary method for stateful business application processing in an otherwise stateless SOA according to embodiments of the present invention.

For further explanation, FIG. 4 sets forth a flow chart illustrating an exemplary method for stateful business application processing in an otherwise stateless SOA according to embodiments of the present invention. The SOA of the method of FIG. 4 is similar to the SOA (106) illustrated in the example of FIG. 1 including, at is does, SOA services (136 and 138 on FIG. 1) where each SOA service carries out a processing step (118 and 120 on FIG. 1) of the business application.

The method of FIG. 4 includes configuring (402) each service of the SOA to record state information describing the state of the service upon completion of a processing step in the business application and provide the state information to a subsequent service. In the method of FIG. 4, configuring (402) each service of the SOA also includes configuring (404)

each service of the SOA to effect both forward processing and reverse processing of a processing step of the business application. Forward processing is the processing of data in a business application in one state to a subsequent, that is, later, state. Reverse processing is the processing of data in a business application in one state to a prior, that is, earlier state. Consider, as an example the phone line provisioning service (314) in the example of FIG. 3. Forward processing by the phone line provisioning service (314) begins with a request for data processing indicating a state of 'qualified,' a state in which a telephone line has not been provisioned for a user. Such forward processing results in a telephone number associated in a database with a unique order identification or with a user's name or address. Reverse processing by the phone line provisioning service (314 on FIG. 3) begins with a request for data processing indicating a state of 'BBprovisioned,' 'ISPprovisioned' or 'Billing,' a state in which a telephone line has been provisioned for a user. Such reverse processing results in a removal of a record in a database that previously associated a telephone number with a unique order identification or with the user's name or address. Such reverse processing may also result in the addition of the telephone number previously associated with the unique order identification in a list of telephone numbers available for provisioning.

The method of FIG. 4 also includes executing (406) the business application in the SOA. Executing (406) the business application in the SOA includes sending (408) requests for data processing among the services where each such request includes a specification of the state of the executing business application. In the method of FIG. 4, sending (408) requests for data processing among the services includes sending (410) requests for both forward processing and reverse processing of a processing step of the business application. Requests for forward or reverse processing may be explicitly identified as such in a message header or the like, or alternatively, the type of data processing requested may be implicit in the state recorded in the request and the service receiving the results. A request for data processing, in the Telco customer establishment application (300) of FIG. 3, for example, that indicates the current state of the application as 'TNprovisioned' may be implicitly identified as a request for reverse data processing if received by the phone line provisioning service. That is, having already provisioned a telephone number as indicated in the state information of the request, the phone line provisioning service (314 on FIG. 3) carries out reverse data processing.

In view of the explanations set forth above, readers will recognize that the benefits of stateful business application processing in an otherwise stateless SOA, according to embodiments of the present invention include:

decoupling the state of a business application from the SOA and SOA services carrying out processing steps of the business application;

decoupling data produced at each processing step from the SOA and SOA services carrying out the processing steps of the business application;

permitting asynchronous execution of processing steps in the business application without the need for overall, tightly coupled application execution control;

enabling full forward and reverse processing of at any state of a stateful business application; and others as will occur to those of skill in the art.

Exemplary embodiments of the present invention are described largely in the context of a fully functional computer system for stateful business application processing in an otherwise stateless SOA. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of stateful business application processing in an otherwise stateless service-oriented architecture ('SOA'), the SOA comprising SOA services, each SOA service carrying out a processing step of a business application, the method comprising:

configuring each service of the SOA to record state information describing a state of the service upon completion of a processing step in the business application and providing the state information to a subsequent service; and executing the business application in the SOA, including sending requests for data processing among the services, each such request comprising a specification of a state of the executing business application; wherein the SOA and the SOA services used to execute the business application are stateless when not executing the business application; wherein the SOA and the SOA services used to execute the business application are stateful when executing the business application wherein executing the business application in the SOA includes each service carrying out a processing step of the business application; wherein carrying out a processing step includes processing data in dependence upon the state of the business application;

wherein sending requests for data processing among the services further comprises sending requests for both forward processing and reverse processing of the processing steps of the business application, wherein forwarding processing is the processing of data in the business application in one state to a later state, wherein reverse processing is the processing of data in the business application in one state to an earlier state; wherein the state of the business application included in the request implicitly identifies the request as for either forward processing or reverse processing of the processing steps of the business application; wherein the web services are described in WSDL and registered in at least one UDDI directory; and wherein the business application comprises a software application that provides business functionality in the SOA.

2. The method of claim 1 wherein the state of the executing business application further comprises a process definition for the business application, a specification of a configuration control version for the business application, a current state of global variables, and a current state of local variables.

3. The method of claim 1 wherein configuring each service of the SOA further comprises configuring each service of the SOA to effect both forward processing and reverse processing of the processing steps of the business application, wherein forwarding processing is the processing of data in the business application in one state to a later state, wherein reverse processing is the processing of data in the business application in one state to an earlier state.

4. The method of claim 1 wherein:
the SOA is implemented with SOA services comprising interoperable web services;
the state information includes an identification of a next type of web service to call for a next processing step of the business application;
executing the business application further comprises looking up in the at least one UDDI directory the next type of web service for the next processing step in the business application; and
sending requests for data processing among the services further comprises sending the requests as SOAP requests.

5. An apparatus for stateful business application processing in an otherwise stateless service-oriented architecture ('SOA'), the SOA comprising SOA services, each SOA service carrying out a processing step of a business application, the apparatus comprising a computer processor, a computer memory operatively coupled to the computer processor, the computer memory having disposed within it computer program instructions capable of:
configuring each service of the SOA to record state information describing a state of the service upon completion of a processing step in the business application and providing the state information to a subsequent service; and
executing the business application in the SOA, including sending requests for data processing among the services, each such request comprising a specification of a state of the executing business application; wherein the SOA and the SOA services used to execute the business application are stateless when not executing the business application; wherein the SOA and the SOA services used to execute the business application are stateful when executing the business application wherein executing the business application in the SOA includes each service carrying out a processing step of the business application; wherein carrying out a processing step includes processing data in dependence upon the state of the business application;
wherein sending requests for data processing among the services further comprises sending requests for both forward processing and reverse processing of the processing steps of the business application, wherein forwarding processing is the processing of data in the business application in one state to a later state, wherein reverse processing is the processing of data in the business application in one state to an earlier state; wherein the state of the business application included in the request implicitly identifies the request as for either forward processing or reverse processing of the processing steps of the business application; wherein the web services are described in WSDL and registered in at least one UDDI directory; and wherein the business application comprises a software application that provides business functionality in the SOA.

6. The apparatus of claim 5 wherein the state of the executing business application further comprises a process definition for the business application, a specification of a configuration control version for the business application, a current state of global variables, and a current state of local variables.

7. The apparatus of claim 5 wherein configuring each service of the SOA further comprises configuring each service of the SOA to effect both forward processing and reverse processing of the processing steps of the business application, wherein forwarding processing is the processing of data in the business application in one state to a later state, wherein reverse processing is the processing of data in the business application in one state to an earlier state.

8. The method of claim 5 wherein:
the SOA is implemented with SOA services comprising interoperable web services;
the state information includes an identification of a next type of web service to call for a next processing step of the business application;
executing the business application further comprises looking up in the at least one UDDI directory the next type of web service for the next processing step in the business application; and
sending requests for data processing among the services further comprises sending the requests as SOAP requests.

9. A computer program product for stateful business application processing in an otherwise stateless service-oriented architecture ('SOA'), the SOA comprising SOA services, each SOA service carrying out a processing step of a business application, the computer program product disposed in a computer readable, recordable medium, the computer program product comprising computer program instructions capable of:
configuring each service of the SOA to record state information describing a state of the service upon completion of a processing step in the business application and providing the state information to a subsequent service; and
executing the business application in the SOA, including sending requests for data processing among the services, each such request comprising a specification of a state of the executing business application; wherein the SOA and the SOA services used to execute the business application are stateless when not executing the business application; wherein the SOA and the SOA services used to execute the business application are stateful when executing the business application wherein executing the business application in the SOA includes each service carrying out a processing step of the business application; wherein carrying out a processing step includes processing data in dependence upon the state of the business application;
wherein sending requests for data processing among the services further comprises sending requests for both forward processing and reverse processing of the processing steps of the business application, wherein forwarding processing is the processing of data in the business application in one state to a later state, wherein reverse processing is the processing of data in the business application in one state to an earlier state; wherein the state of the business application included in the request implicitly identifies the request as for either forward processing or reverse processing of the processing steps of the business application; wherein the web services are described in WSDL and registered in at least one UDDI directory; and wherein the business application comprises a software application that provides business functionality in the SOA.

10. The computer program product of claim 9 wherein the state of the executing business application further comprises a process definition for the business application, a specification of a configuration control version for the business application, a current state of global variables, and a current state of local variables.

11. The computer program product of claim 9 wherein configuring each service of the SOA further comprises configuring each service of the SOA to effect both forward processing and reverse processing of the processing steps of the business application, wherein forwarding processing is the processing of data in the business application in one state to a later state, wherein reverse processing is the processing of data in the business application in one state to an earlier state.

12. The computer program product of claim 9 wherein:
the SOA is implemented with SOA services comprising interoperable web services;
the state information includes an identification of a next type of web service to call for a next processing step of the business application;
executing the business application further comprises looking up in the at least one UDDI directory the next type of web service for the next processing step in the business application; and
sending requests for data processing among the services further comprises sending the requests as SOAP requests.

\* \* \* \* \*